April 1, 1969          J. C. STERNBERG          3,435,660

STEAM FLOW RATE MONITORING APPARATUS AND METHOD

Filed June 20, 1966

JAMES C. STERNBERG
INVENTOR.

BY
ATTORNEY

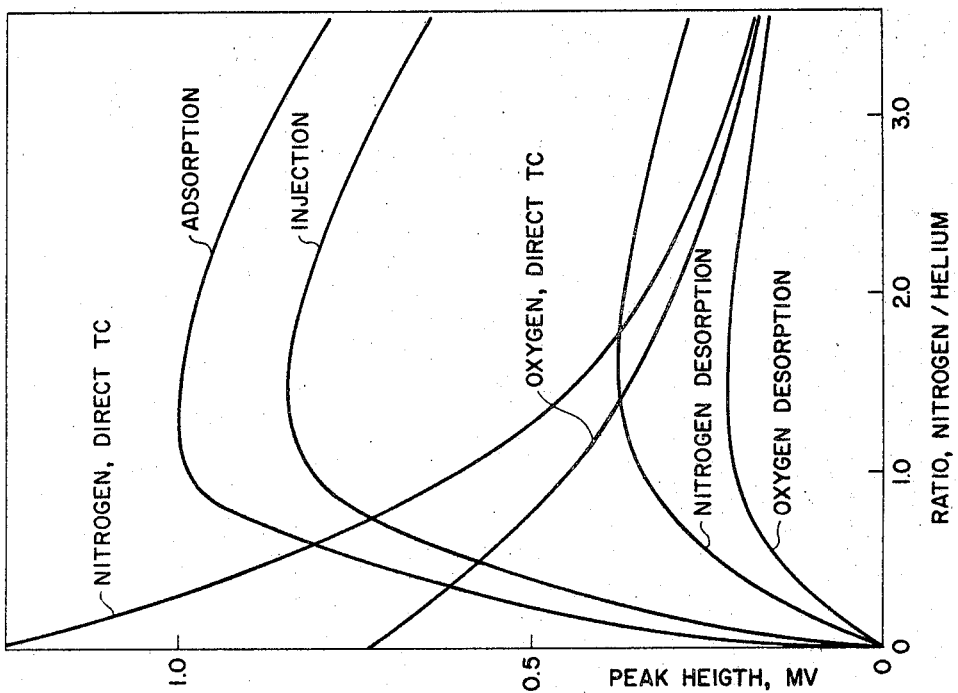
FIG. 4
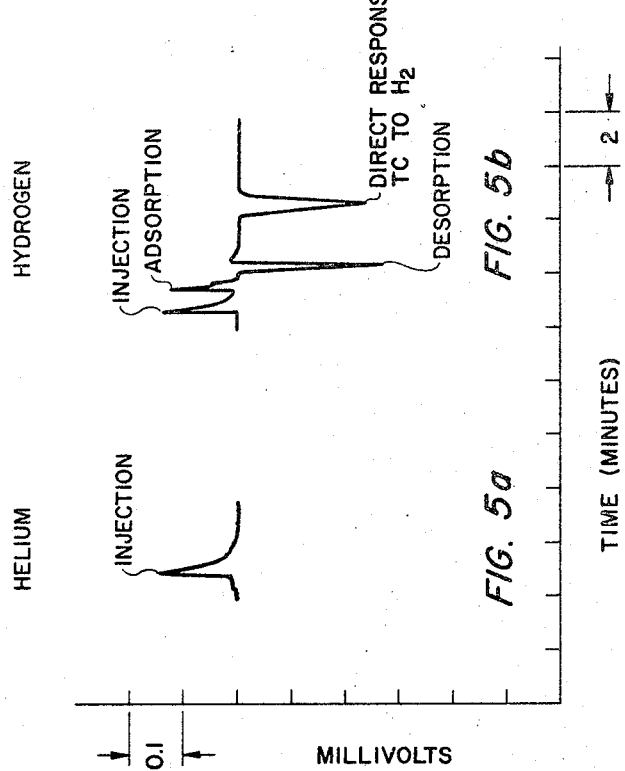
FIG. 5a
FIG. 5b

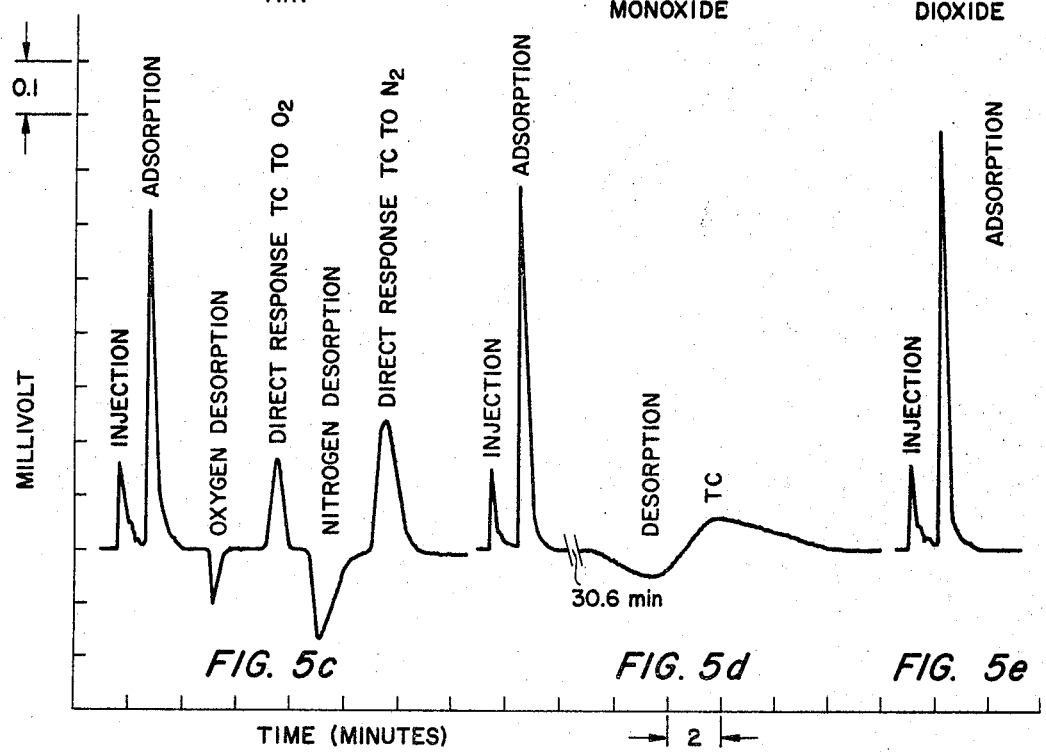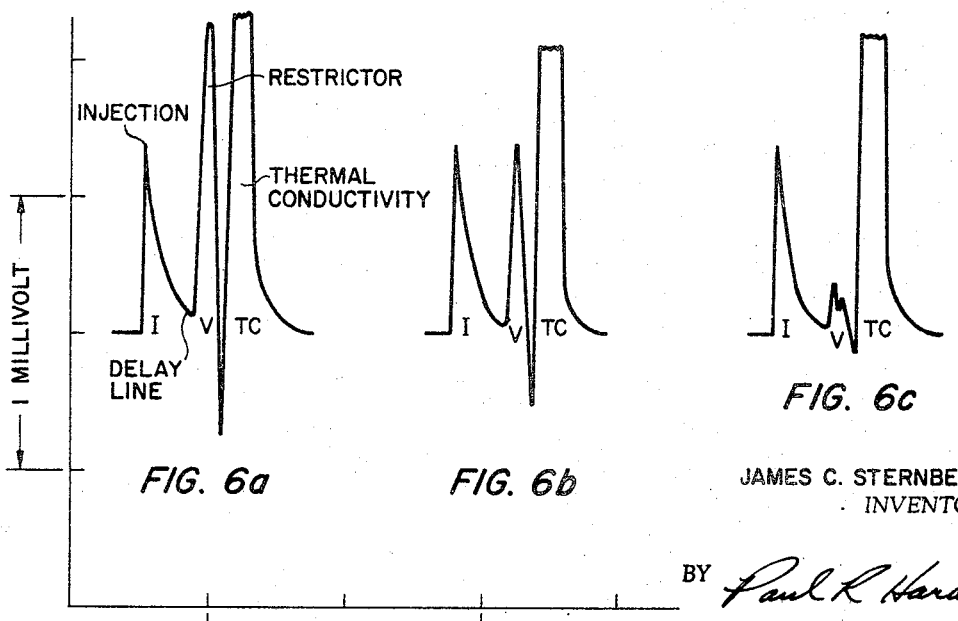

JAMES C. STERNBERG
INVENTOR.

BY *Paul R. Harder*

ATTORNEY 3,435,660
STEAM FLOW RATE MONITORING
APPARATUS AND METHOD
James C. Sternberg, Fullerton, Calif., assignor to Beckman Instruments, Inc., a corporation of California
Filed June 20, 1966, Ser. No. 558,691
Int. Cl. G01n 31/08
U.S. Cl. 73—23.1                16 Claims

ABSTRACT OF THE DISCLOSURE

A flow sensitive system is disclosed in which a tracer substance is introduced into a fluid stream at a point preferably just upstream of a detector sensitive to the tracer. If the tracer is introduced at a fixed rate and a concentration sensing detector utilized or if the tracer is introduced at a fixed concentration and a rate sensing detector utilized, the detector output would provide an indication of flow changes in the fluid stream. The system may be utilized therefore merely as a flow monitor or may be utilized in conjunction with other systems, such as chromatographic analyzers, to provide real time indications of events occurring upstream from the detector when those events are accompanied by flow changes.

---

This invention relates generally to methods and apparatus for chromatographic processes and more particularly to a new and improved method and apparatus for performing the chromatographic process which provides continuous monitoring of the carrier gas flow throughout the running of the chromatogram and which provides, with a single downstream detector, an output indicative of a variety of upstream processes as they occur.

It is a common practice in the chromatographic art to utilize a detector which senses the presence of a sample as it passes through the detector. Where a sample contains several components separated by the chromatographic column, the output of the detector is a series of peaks indicating the time of passing of the particular component through the detector and the peak area is a measure of the quantity of the component. It has been the general practice to attempt to select detectors which are not flow responsive since changes in carrier gas flow provided undesired variations in background current.

The present invention provides a chromatographic system which utilizes a single flow-sensitive detector to record various processes as they occur at differing points upstream. The system provides a record of the shape of the sample introduction pulse, and reveals the carrier gas flow changes upon sorption and desorption of various components. The invention also provides a new and novel sensor capable of accurately detecting the flow rate in gaseous streams.

The present invention will become better understood by those skilled in the art by reference to the following detailed specification when considered in connection with the accompanying drawings which describe preferred embodiments of the instant invention and the particular features of novelty will be set forth in the appended claims. In the drawings:

FIG. 4 illustrates the relative effects of different variables on the operation of the embodiment of FIG. 1;

FIG. 5 illustrates traces for different samples introduced into the apparatus of FIG. 1;

Figure 1:
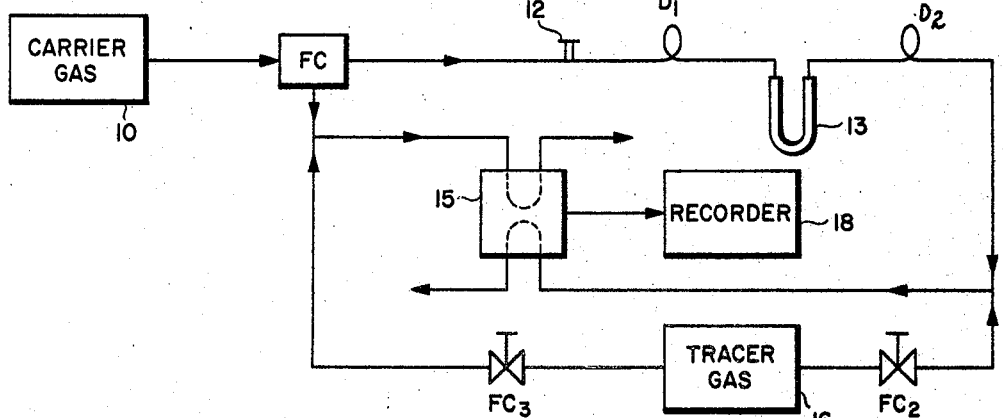
FIG. 1 is a schematic diagram of one preferred embodiment of the invention.

Referring now to FIG. 1 a source of carrier gas 10 provides carrier gas flow for the chromatograph through any suitable flow contoller FC. The carrier gas stream is split into a sample stream and a reference stream and the flow regulated by dual flow controller FC. The sample and reference streams are individually flow controlled by the dual flow controller. The sample stream passes any suitable sampling system 12 such as a sampling valve and/or an injection port. Delay lines $D_1$ and $D_2$ are provided in the sample streams and may comprise tubing packed with an inert packing or a suitable length of empty tubing. Delay lines $D_1$ and $D_2$ are inserted to separate the process of injection from absorption and desorption from direct detection on the final chromatogram. A chromatographic column 13 is provided intermediate delay lines $D_1$ and $D_2$ and may be either of the partitioning or adsorption type. A detector 15 is provided having a sampling side and a reference side. The sample stream after passing delay line $D_2$ is introduced to one side of the detector and the reference stream to the other side of the detector.

A source of tracer gas 16 is provided. The tracer gas is bled into the sample stream at a fixed flow rate by means of flow controller $FC_2$ at a point just upstream of detector 15. Tracer gas is also bled into the reference stream at a fixed rate through flow controller $FC_3$. Flow controllers $FC_2$ and $FC_3$ in their simplest form may be needle valves. It is to be understood that a single dual flow controller similar to FC could replace the controllers $FC_2$ and $FC_3$.

Detector 15 may be of any suitable type of detector which measures the concentration of a particular gas or which responds to bulk properties of the gas mixture in a manner reflecting changes of the relative amounts of the components of the mixture. Background flow changes occurring in both streams will automatically be compensated while the output of the detector will be indicative of the difference in flow between the reference and sample streams. This difference will indicate flow changes in the sample stream due to various processes therein which do not occur in the reference stream. The output of detector 15 may be supplied to any suitable indicating means such as recorder 18 to provide a permanent record of the detector output.

It should be obvious that if the tracer gas is introduced into the sample and reference streams at a fixed rate just prior to the detector, any change in the flow rate of the carrier gas will result in a change in concentration of the tracer and of the carrier as they flow through the detector. For example, if the carrier gas flow rate increases, the concentration of the tracer gas will decrease and the concentration of carrier gas will increase. On the other hand, if the flow rate of the carrier gas decreases, the concentration of the tracer will increase and the concentration of the carrier gas will decrease. Many types of concentration sensitive detectors may be utilized and include not only the standard gas chromatographic detectors such as the thermal conductivity, electron capture and cross section ionization detectors but also various electrochemical sensors such as pH meters as well as spectrophotometers, non-dispersive infrared detectors and others. Since the tracer gas is introduced immediately before the detector and downstream of all processes taking place in the column, its presence does not adversely affect these processes. The only criterion is that the detector sense the concentration of the tracer in the carrier gas or the concentration of carrier in the tracer gas. It should be apparent that with the arrangement illustrated in FIG. 1 the detector may be utilized to record any upstream process as it occurs if that process is accompanied by a resulting change in carrier gas flow. The advantages of such a detector will become more apparent hereinafter.

Figure 2:
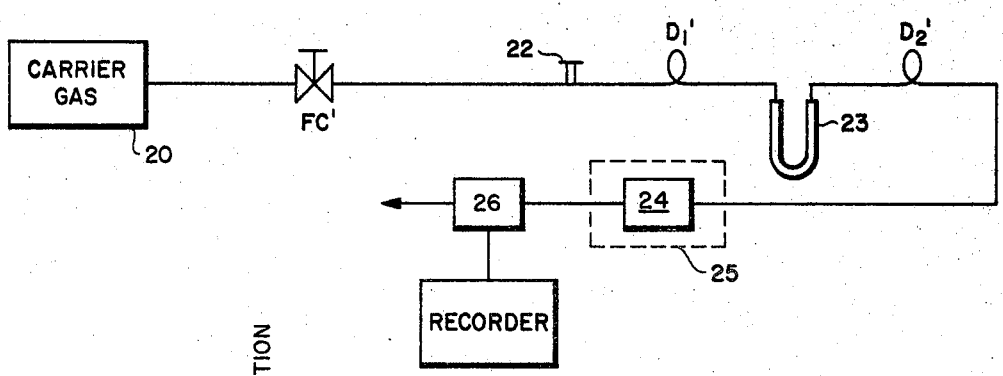
FIG. 2 is a schematic diagram of a second preferred embodiment of the invention.

A second chromatographic system utilizing a rate of introduction sensing detector is illustrated in FIG. 2. In this system carrier gas from source 20 is regulated by flow controller FC' and passes any suitable sampling system 22 such as a sampling valve and/or injection port. Delay lines $D_1'$ and $D_2'$ are located on either side of a chromatographic column 23 which may be either an adsorption or partitioning column. The carrier gas then passes a rate of introduction detection system. The detection system includes a saturator 24 located within any suitable temperature controlling device 25. The saturator is thermally controlled so as to furnish a tracer substance at fixed thermodynamic activity, thus at fixed concentration. The carrier gas with the tracer after passing through the saturator then passes a rate of introduction detector or sensor 26, which is quantitatively responsive to the presence of tracer substance and may be, but does not necessarily have to be, responsive to the sample constituents, and is then vented in any suitable manner. The output of detector 26 is fed to any suitable indicating device or recorder. If measurement of flow changes rather than absolute flows is desired, the background signal corresponding to normal flow may be compensated by a bucking circuit or by a similar reference detector in a reference line without sample injection; if absolute flow rates are to be measured, a bucking circuit may still be desirable to compensate for the (generally much smaller) background current corresponding to zero flow.

The temperature at which the saturator is held by the constant-temperature bath, thus determining the thermodynamic activity of the tracer, together with the area of tracer exposed to the fluid stream and the fluid stream flow rate will determine whether or not the tracer reaches equilibrium concentration. For proper functioning over the entire range of flow it is desirable that the tracer always reach equilibrium concentration. Thus, the saturator must be constructed so that the extent thereof is sufficient to insure equilibrium concentration of the tracer at the highest expected fluid flow rate. The saturator temperature should be maintained sufficiently low that the tracer activity is below that which would correspond to equilibrium with the connecting tubing between the saturator and the detector, so that the tracer activity is actually determined by the temperature in the saturator.

If the detector 26 is rate of introduction sensitive and gives an absolutely known response the output of the detector becomes a measure of the carrier gas flow completely independent of what gases are employed or measured. Several rate of introduction sensors are well known in the art such as the hydrogen flame ionization detector or the Hersch galvanic cell utilized with an iodine saturator. A suitable example of the hydrogen flame ionization detectors are described in Chapter 18 of Gas Chromatography, Academic Press, New York, 1962, and in U.S. Patent 2,372,000. Organic compounds to which the flame ionization detector is sensitive can be used as the tracer substances. A suitable example of a galvanic cell is illustrated in FIG. 2 of U.S. Patent 3,258,411. For use in the instant invention the conversion unit (reference numeral 58 of FIG. 2 of Patent 3,258,411) would be replaced by an iodine saturator. For a more complete understanding of the functioning of the rate of introduction sensor as a flow rate detector, reference is made to my copending application entitled, Apparatus and Method for Flow Monitoring, Ser. No. 558,787 filed concurrently herewith.

It should be apparent that the rate of introduction sensor detecting changes in flow rate of the carrier gas may be utilized in the same manner as the detector of FIG. 1 to indicate any upstream process at the time of occurrence if such process is accompanied by a change in carrier gas flow rate.

Figure 3:
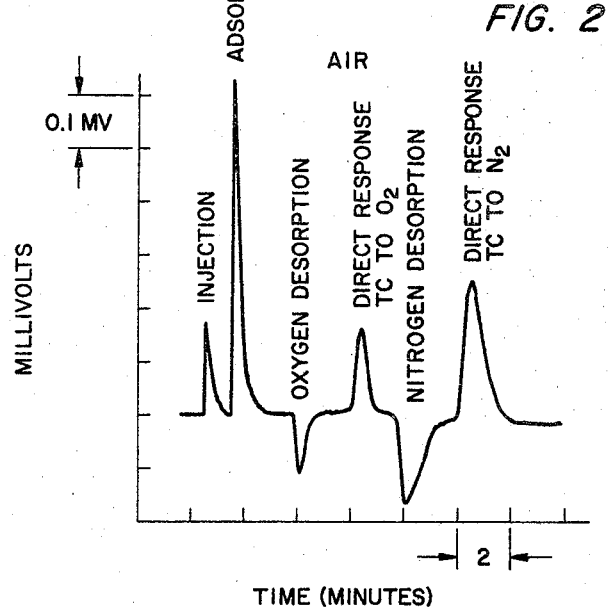
FIG. 3 is a typical trace taken from the recorder of the apparatus of FIG. 1 illustrating the operation thereof.

FIG. 3 illustrates the typical output from a concentration sensing detector in the system of FIG. 1. The apparatus utilized was a Beckman GC-2A Laboratory Gas Chromatograph with a gas sampling valve and a thermal conductivity detector. A six foot by ¼ inch molecular sieve column was placed in the thermal compartment. The upstream delay line consisted of four feet of ¼ inch O.D. open tubing and the downstream delay line $D_2$ was an eighteen foot length of ⅛ inch O.D. tubing. Nitrogen from a regulated supply was introduced as the tracer gas into the sample side of the thermal conductivity detector through a T-tube mounted downstream of the delay line $D_2$ and just before the detector. Nitrogen was also introduced through a similar T-tube into the reference carrier side just before the reference side of the detector. The flow of the tracer from the common source was individually adjusted by means of needle valves located just before the T-tubes.

The carrier flow rate was measured at a desired value and balanced between the sample and reference lines by means of a needle valve installed in the reference line. Helium at a flow rate of 85.5 cc./min. was utilized as the carrier gas. The nitrogen flow rate was adjusted by means of a pressure regulator on the tracer gas container and the needle valve in the sample line. The needle valve in the reference line was then opened and adjusted to null the background signal. With a single setting of the needle valves a large range of tracer gas flow ($N_2$) could be achieved by mere adjustment of the nitrogen pressure. Sample gases were introduced through a normal four port gas sampling valve and the thermal conductivity detector output was connected to a 5 millivolt strip-chart recorder.

The trace of FIG. 3 was obtained at a temperature of 24° C. on a sample of 1 cc. of air. One quarter (0.25) mole fraction of nitrogen was added at a fixed rate. It should be noted that when a flow sensitized detector is utilized four major peaks are obtained for the system illustrated in FIG. 1. These peaks can be ascribed, as indicated in FIG. 3, to (a) injection (a flow decrease leading to increased nitrogen concentration at the detector and a positive deflection because the sample valve was at atmospheric pressure and the head of the column at 14.4 p.s.i.g.); (b) adsorption (a flow decrease because oxygen and nitrogen are removed from the gas phase to an adsorbed phase on the molecular sieve); (c) desorption of oxygen (a flow increase, giving a negative deflection, as oxygen comes off the sieve and into the gas phase); and (d) desorption of nitrogen (a flow increase as nitrogen comes off the sieve and returns to the gas phase). The other major positive deflections are the direct positive response of the thermal conductivity detector to oxygen and nitrogen. Had the tracer gas and the detector been selected such that the detector responded only to the tracer gas, these peaks would not have been present. Smaller flow deflections are barely discernible as fine structure on the principal flow peaks. These are at present not completely understood, and are probably associated with viscosity and thermal effects.

It was found with the apparatus of FIG. 1 that higher nitrogen flows, mole fractions of 0.40 and 0.60, led to increased flow response and decreased direct thermal conductivity response to the partitioned oxygen and nitrogen in the air sample. A still higher tracer flow (nitrogen at mole fraction 0.78) led to a fall off of both flow and direct thermal conductivity response.

The effects of the tracer to carrier gas ratio ($N_2$:$H_e$) are illustrated in FIG. 4 for the nitrogen tracer helium carrier gas of the foregoing described apparatus. It is noted that the flow responses are relatively constant from a ratio of 1:1 to approximately 2:1. The direct thermal conductivity response falls off rapidly as the nitrogen flow is increased due primarily to greater dilution at increased total gas flow through the detector.

Referring now to FIG. 5 a series of traces obtained by injecting equivalent quantities of different gas samples is illustrated which demonstrates the flow sensitive mode of operation of the detector. In each case the same apparatus was utilized as described hereinbefore and 1 cc. of the gas sample was injected.

FIG. 5a illustrates a trace for a helium sample which shows only the injection peak with no adsorption, desorption or direct thermal conductivity response.

FIG. 5b illustrates a trace for a hydrogen sample which shows an injection peak, a small adsorption peak since only a small fraction of the hydrogen is in the adsorbed stage as it passes through the column, a desorption peak very shortly after adsorption since hydrogen goes through the column in a short time and a negative-going direct thermal conductivity peak since hydrogen enhances the thermal conductivity of the 1:1 tracer to carrier gas mixture in the detector.

FIG. 5c illustrates the trace for an air sample showing the features illustrated in FIG. 3. Here it is noted that the adsorption peak is greater than for a hydrogen sample resulting from the longer retention of oxygen and nitrogen, indicating that a larger fraction of these gases is found in the adsorbed state during passage through the column.

FIG. 5d illustrates a trace for a carbon monoxide sample showing a still larger adsorption peak in accordance with the longer retention of carbon monoxide.

FIG. 5e illustrates a trace for carbon dioxide which does not detectably elute from the column, showing injection and large adsorption peaks, but no desorption or direct thermal conductivity response.

It should be noted that for each of the samples the injection peaks are essentially identical and the adsorption peaks increase in accordance with increasing retention. Thermal or viscosity effects appear but are difficult to predict, since some either seem to come before and some after the corresponding adsorption or desorption peaks.

The foregoing chromatograms illustrates the wide latitude of qualitative interpretation that may be placed upon the processes being observed with the flow systems of FIGS. 1 and 2.

In some traces close inspection revealed small positive deflections just preceding the desorption peaks of oxygen and nitrogen in an air sample. In attempting to interpret the deflections it was found that the embodiments of the present invention, with slight modification, could be utilized to study the viscosity effects of various samples. In the embodiment of FIG. 1, the column 13 was replaced by a restrictor and the traces of FIG. 6 were obtained with a helium carrier for samples of argon, oxygen, air, hydrogen, carbon dioxide, carbon monoxide and nitrogen. By increasing the length of delay line $D_2$ better separation of the overshoot and the direct thermal conductivity response could be obtained.

Figures 6D, 6E, 6F, 6G:
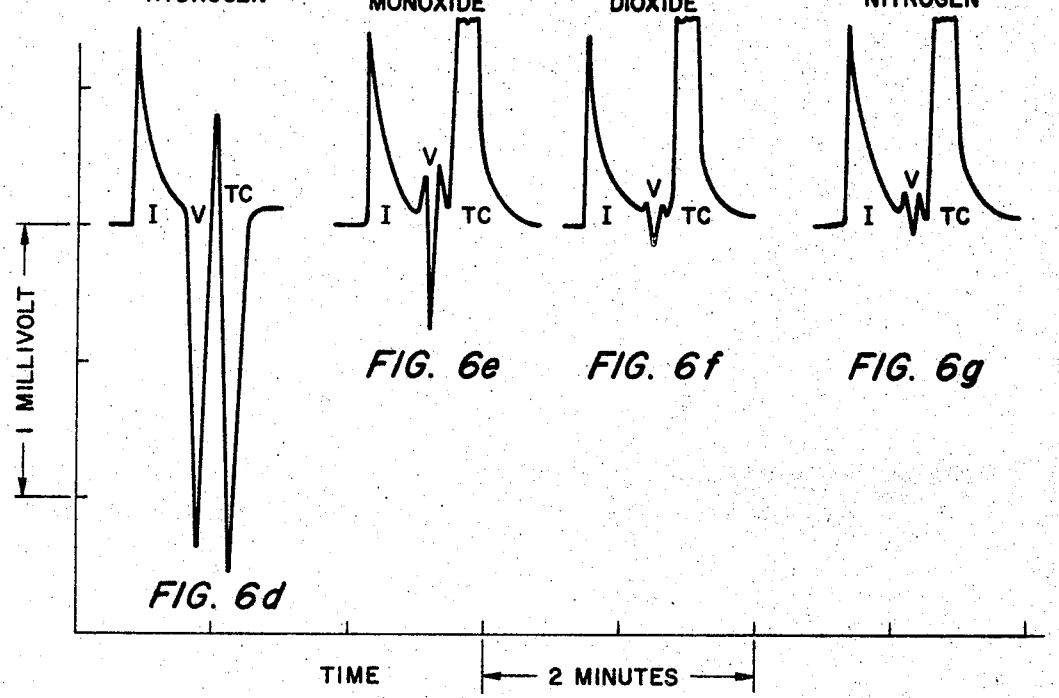
FIG. 6 illustrates traces for some of the same samples as FIG. 5 but with a restrictor replacing the chromatographic column of FIG. 1.

Upon a sample component reaching a restrictor in the fluid stream, a change in concentration or rate of introduction of the tracer substance to the sensor will occur, with the magnitude and direction of this change dependent upon the viscosity of the sample component. In FIG. 6a the trace shows the injection peak and a positive deflection as the sample component passes the restrictor. Since the viscosity of argon is higher than that of the carrier helium, flow is restricted as the component passes the restrictor and the concentration of the tracer increases, as indicated by the increased output of the thermal conductivity detector. The passage of the higher viscosity component through the restrictor tends to build up a back-pressure in the system as the component passes the restrictor, resulting in a momentary increase in flow rate above the normal condition when carrier first again fills the restrictor. In the case of a hydrogen sample, which is less viscous than helium, flow increases as the sample component passes the restrictor, resulting in a negative deflection; the attendant reduction in pressure results in the overshoot in the opposite direction.

The peculiar W-shape of the viscosity peaks obtained for nitrogen, carbon monoxide and carbon dioxide may be explained by the tendency of the viscosity to pass through a maximum at a composition intermediate between pure helium and pure sample. In the case of hydrogen, oxygen and argon, however, the viscosity changes monotonically, although not linearly, between pure helium and pure sample, so that the W-shaped peak is not obtained.

The viscosity effect of a component pulse, or a sample injection of relatively short duration into the stream, can be utilized to meter the flow of a gaseous fluid stream.

Figure 7A:
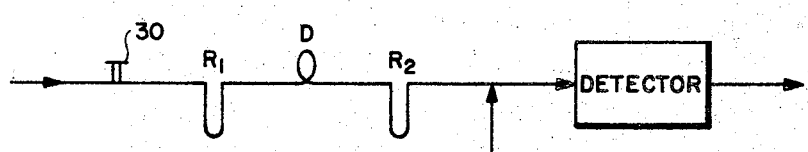
FIG. 7 illustrates a prefered embodiment of a flow monitoring apparatus.

Referring to FIG. 7a a known or calibrated volume such as delay line D is connected between two restrictors $R_1$ and $R_2$. A tracer substance is introduced upstream of the detector as hereinbefore described. The detector may be either concentration sensitive or rate of introduction sensitive. If a sample component, or sample pulse, is injected at 30, two viscosity peaks will occur, one for each restrictor, indicating the time when the component enters and leaves the known volume. The transit time of the component through the known volume is a measure of the fluid flow rate.

Figure 7B:
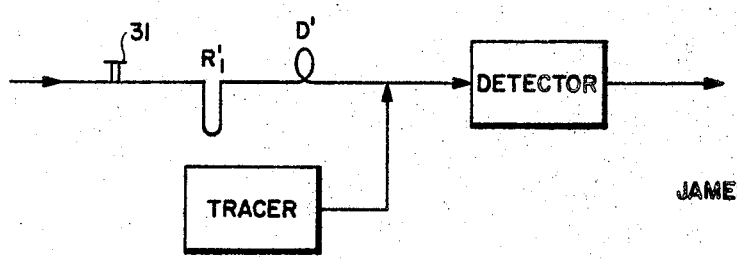

In FIG. 7b a known volume D' is located between a restrictor $R_1'$ and the detector. By selecting a sample component to which the detector has a direct response, the transit time from the pressure pulse when the component passes the restrictor to the direct detector response is a measure of the time taken by the component to sweep a known volume. The sample component may be introduced at any convenient upstream point in the system. If an appropriate detector is selected, such as a thermal conductivity detector, the known volume from $R_1'$ to the detector will be at atmospheric pressure and no pressure correction need to be made as is the case in the embodiment of FIG. 7a. As an example in the later embodiment, if the transit time from the pressure pulse due to the restrictor to the direct thermal conductivity response is 2 min. and the known volume is 50 cc., the fluid flow rate is 25 cc. min.

There has been illustrated and described a new and novel method and apparatus by which a variety of upstream processes may be observed with a single downstream detector as they occur. As applied to the chromatographic process the character of the sample injection, information concerning the sorption and desorption isotherms, possible information concerning thermal and viscosity effects, and the retention time of a component or components within the column may be observed with a single detector during a single chromatograph run. Depending upon the particular tracer and detector utilized direct response to the sample may or may not occur. This, however, can be controlled generally at the will of the operator.

Further, the detector output which indicates the elution of the sample component or components from the column may be utilized to institute valving for trapping or other purposes. It should also be understood that the detector sensing the tracer substance may or may not provide a direct output if and when sample components pass this detector. If a thermal conductivity detector is utilized, in most instances direct thermal conductivity response to the sample components will also be present. In other instances it may be desirable to provide a main non-destructive detector upstream from the point at which tracer substance is introduced, depending upon the purpose of the particular analytical system. Further, the stream may be split after the column and a main detector provided in one branch and a tracer and tracer detector in the other.

The desorption peak in most instances is proportional to the quantity of component sorbed on the column and may therefore be used to anticipate the magnitude of the direct detector response. By appropriate control the tracer detector may be utilized to set the sensitivity of a main detector as desorption of each component occurs.

The embodiments of FIGS. 1 and 2 are given by way of illustration only and many modifications and variations thereof are possible and will be obvious to those skilled in the art in light of the teachings herein contained without departing from the spirit and scope of the appended claims.

What is claimed is:

1. A chromatographic analyzer having an output response which is a real time indication of flow changes in the analyzer comprising:
   at least one chromatographic column;
   means for connecting said column to a source of carrier fluid, said means including sampling means for introducing a sample into said carrier fluid for separation into sample constituents in said chromatographic column;
   conduit means for conducting at least a portion of the effluent from said column;
   means for continuously introducing a tracer substance into at least said portion of said effluent in said conduit means from said column;
   detector means communicating with said conduit means, said detector means being quantitatively responsive to the presence of said tracer substance thereby providing a response to flow changes in the effluent stream, the sensitivity of said detector to said tracer substance being substantially unaffected by the presence of other substances in said carrier fluid; and
   means for indicating the output of said detector.

2. The analyzer of claim 1 wherein said tracer substance introducing means introduces said tracer substance at a fixed rate of flow and said detector senses the relative concentration of said tracer substance and said carrier fluid.

3. The analyzer of claim 1 wherein said tracer substance introducing means introduces said tracer substance at a fixed thermodynamic activity and said detector is sensitive to the rate of introduction of said tracer to the detector.

4. The analyzer of claim 1 wherein said tracer substance introducing means includes a thermostated iodine saturator and said sensor is an iodine sensitive galvanic cell.

5. The analyzer of claim 1 wherein said tracer has a thermal conductivity coefficient different from said carrier fluid and said sensor is of the thermal conductivity type.

6. A chromatographic analyzer comprising:
   conduit means including stream splitter means for providing a reference fluid stream and a sample fluid stream, said conduit means including means for maintaining said streams at fixed flow rates;
   means for connecting said conduit means to a source of carrier fluid;
   sampling means connected to said conduit means for introducing a sample to said sample fluid stream;
   chromatographic column means connected to receive said sample fluid stream;
   means for conducting at least a portion of the effluent stream from said chromatographic column;
   detector means having reference and sample sides;
   means for conducting said reference fluid stream to the reference side of said detector and means for conducting said portion of said effluent stream from said chromatographic column into said sample side of said detector;
   means for continuously introducing upstream from said detector a tracer substance into at least a portion of said effluent stream and into said reference stream, said detector being quantitatively responsive to the presence of said tracer substance thereby providing a response to flow changes in the effluent stream, the sensitivity of said detector to said tracer substance being substantially unaffected by the presence of other substances in said fluid stream; and
   means indicating the output of said detector as a function of time.

7. The chromatographic system of claim 6 wherein said means connecting the effluent from said column to said detector includes a delay means.

8. The chromatographic analyzer of claim 6 wherein said tracer substance has a thermal conductivity coefficient different from the carrier fluid and said detector indicates the difference in the thermal conductivity of the sample fluid stream with respect to the reference fluid stream.

9. A method for detecting the sorption and desorption of a sample in a chromatographic column comprising the steps of:
   continuously introducing a tracer substance into the carrier fluid stream downstream of the column;
   introducing a sample into the carrier fluid stream upstream from said column; and
   sensing flow changes in the column effluent fluid stream by detection means quantitatively responsive to the presence of tracer substance but substantially unaffected by the presence of other substances in said fluid stream.

10. The method of claim 9 wherein said tracer substance is introduced at a fixed flow rate and changes in the concentration of said tracer are indicated by the detection means.

11. The method of claim 9 wherein said tracer substance is introduced at fixed thermodynamic activity and the quantity per unit time of said tracer entering into said detector means is indicated by said detector output.

12. The flow rate indicator of claim 14 wherein said detector includes reference and sample chambers, said fluid stream being directed through at least said sample chamber and means directing a reference stream through said reference chamber.

13. A flow rate indicator comprising:
   a thermal conductivity detector having reference and sample chambers;
   conduit means for directing a fluid stream through said sample chamber;
   means for directing a reference fluid stream through said reference chamber at a constant flow rate; and
   means upstream from said thermal conductivity detector for continuously introducing a tracer substance at a fixed flow rate into the fluid streams flowing through said sample chamber and said reference chamber whereby differences in the flow rates of said reference and sample streams may be detected.

14. A flow rate indicator for indicating the rate of flow of a fluid stream comprising:
   a fluid stream conduit;
   means connected to said conduit for continuously introducing a tracer substance into said fluid stream conduit at a fixed rate of flow;
   a thermal conductivity detector connected into said conduit at a point downstream from said last named means and indicating the concentration of said tracer substance relative to the remaining constituents in said fluid stream; and
   means for indicating the output of said detector thereby providing a response which is a measure of the rate of flow of said stream.

15. A fluid flow monitoring system comprising:
   a conduit for containing a fluid stream;
   means for introducing a component pulse into said fluid stream;
   first and second restrictors in said conduit separated by a known volume, said rectrictors being adapted to produce a detectable change in fluid flow rate of said fluid stream as said component pulse passes through said restrictors;

means downstream from said restrictors for continuously introducing a tracer substance into said fluid stream;

detector means in said fluid stream downstream from said tracer introduction point, said detector means being quantitatively responsive to the presence of said tracer substance thereby providing a response to said changes in said fluid flow rate produced by passage of said component pulse through said restrictors whereby the transit time of said component pulse through said known volume may be determined.

16. A fluid flow monitoring apparatus comprising:

a conduit for containing a fluid stream;

means for introducing a component pulse into said fluid stream;

a restrictor in said conduit, said restrictor being adapted to produce a detectable change in fluid flow rate of said fluid stream as said component pulse passes through said restrictor;

a known volume in said conduit downstream from said restrictor;

means downstream from said restrictor for continuously introducing a tracer substance into said fluid stream;

detector means in said fluid stream downstream from said tracer introduction point and said known volume, said detector means being quantitatively responsive to the presence of said tracer substance thereby providing a response to said changes in said fluid flow rate produced by passage of said component pulse through said restrictor, said detector also being responsive directly to said component pulse whereby the transit time of said component through said volume between said restrictor and said detector may be determined.

References Cited

UNITED STATES PATENTS

| | | | |
|---|---|---|---|
| 3,304,170 | 2/1967 | Hinsvark | 75—34 |
| 3,304,159 | 2/1967 | Hinsvark | 23—230 |
| 3,117,225 | 1/1964 | Willis | 250—43.5 |

RICHARD C. QUEISSER, *Primary Examiner.*

VICTOR J. TOTH, *Assistant Examiner.*

U.S. Cl. X.R.

73—194